(12) United States Patent
Zou et al.

(10) Patent No.: US 9,448,075 B2
(45) Date of Patent: Sep. 20, 2016

(54) METHOD AND TERMINAL FOR ACQUIRING ROAD CONDITION INFORMATION

(71) Applicant: ZTE CORPORATION, Shenzhen, Guangdong Province (CN)

(72) Inventors: Wei Zou, Shenzhen (CN); Yan Wang, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/398,748

(22) PCT Filed: Jul. 1, 2013

(86) PCT No.: PCT/CN2013/078605
§ 371 (c)(1),
(2) Date: Nov. 4, 2014

(87) PCT Pub. No.: WO2013/182107
PCT Pub. Date: Dec. 12, 2013

(65) Prior Publication Data
US 2015/0112589 A1    Apr. 23, 2015

(30) Foreign Application Priority Data
Nov. 23, 2012  (CN) .......................... 2012 1 0483255

(51) Int. Cl.
*G01C 21/26*    (2006.01)
*G08G 1/0967*   (2006.01)
*G08G 1/16*     (2006.01)

(52) U.S. Cl.
CPC ........... *G01C 21/26* (2013.01); *G08G 1/09675* (2013.01); *G08G 1/096716* (2013.01); *G08G 1/096791* (2013.01); *G08G 1/163* (2013.01); *G08G 1/166* (2013.01)

(58) Field of Classification Search
CPC ........... G01C 21/26; G08G 1/096791; G08G 1/096716; G08G 1/09675; G08G 1/163; G08G 1/166
USPC ......................................................... 701/522
See application file for complete search history.

(56) References Cited

U.S. PATENT DOCUMENTS 6,252,520 B1    6/2001  Asami et al.
6,611,755 B1 *  8/2003  Coffee .................... B28C 5/422
                                            340/438

(Continued)

FOREIGN PATENT DOCUMENTS

CN    101004861 A    7/2007
CN    101114836 A    1/2008

(Continued)

OTHER PUBLICATIONS

European Search Report issued Mar. 9, 2016 in European Patent Application No. 13799840,7, 9 pages.

*Primary Examiner* — Atul Trivedi
(74) *Attorney, Agent, or Firm* — Plumsea Law Group, LLC

(57) ABSTRACT

A method and a terminal for acquiring road condition information are provided, wherein, the method includes: forming an Ad Hoc network with other terminals; acquiring own position information through positioning; exchanging position information with other terminals in a network through the Ad Hoc network; and acquiring the road condition information according to the exchanged position information. The present method realizes a technical effect of acquiring the road condition information without an operator.

8 Claims, 3 Drawing Sheets

(56) References Cited

U.S. PATENT DOCUMENTS

| | | | |
|---|---|---|---|
| 6,862,500 B2* | 3/2005 | Tzamaloukas | G01C 21/26 340/991 |
| 6,947,880 B2* | 9/2005 | Johnson | G01C 21/16 701/300 |
| 7,426,437 B2* | 9/2008 | Breed | B60N 2/2863 340/435 |
| 7,791,503 B2* | 9/2010 | Breed | B60N 2/2863 340/989 |
| 8,175,802 B2* | 5/2012 | Forstall | G01C 21/3484 701/424 |
| 8,935,094 B2* | 1/2015 | Rubin | G08G 9/02 701/517 |
| 8,989,763 B2* | 3/2015 | Paulson | G01S 19/258 455/404.2 |
| 9,020,755 B1* | 4/2015 | Gazit | G01S 19/07 342/357.24 |
| 9,154,982 B2* | 10/2015 | Chan | H04W 24/08 |
| 2002/0198660 A1 | 12/2002 | Lutter et al. | |
| 2004/0138809 A1* | 7/2004 | Mukaiyama | G08G 1/096716 701/400 |
| 2004/0193372 A1* | 9/2004 | MacNeille | G01C 21/26 701/468 |
| 2004/0230370 A1* | 11/2004 | Tzamaloukas | G01C 21/3492 701/400 |
| 2004/0230373 A1* | 11/2004 | Tzamaloukas | G01C 21/28 701/468 |
| 2004/0230374 A1* | 11/2004 | Tzamaloukas | G01C 21/28 701/495 |
| 2005/0065715 A1* | 3/2005 | Watanabe | G01C 21/26 701/517 |
| 2006/0167784 A1* | 7/2006 | Hoffberg | G06Q 20/401 705/37 |
| 2007/0124063 A1* | 5/2007 | Kindo | G01C 21/26 701/517 |
| 2007/0282532 A1 | 12/2007 | Yamamoto et al. | |
| 2008/0088486 A1* | 4/2008 | Rozum | G08G 1/096716 340/995.13 |
| 2009/0043506 A1* | 2/2009 | Breed | G08G 1/161 701/472 |
| 2010/0317420 A1* | 12/2010 | Hoffberg | G06Q 30/0207 463/1 |
| 2011/0112748 A1* | 5/2011 | Bauchot | G08G 1/0104 701/119 |
| 2012/0016581 A1 | 1/2012 | Mochizuki et al. | |
| 2012/0038489 A1 | 2/2012 | Goldshmidt | |
| 2015/0112590 A1* | 4/2015 | Fureder | G08G 1/22 701/522 |
| 2016/0086391 A1* | 3/2016 | Ricci | G07C 5/008 701/29.3 |

FOREIGN PATENT DOCUMENTS

| | | |
|---|---|---|
| CN | 01951550 A | 1/2011 |
| CN | 103052023 A | 4/2013 |

* cited by examiner

| Terminal ID | Terminal name |
|---|---|
| Carrier type ||
| Longitude | Latitude |
| Speed ||
| Direction ||

METHOD AND TERMINAL FOR ACQUIRING ROAD CONDITION INFORMATION

CROSS-REFERENCE TO RELATED APPLICATION(S)

This application is the U.S. National Phase application of PCT application number PCT/CN2013/078605 having a PCT filing date of Jul. 1, 2013, which claims priority of Chinese patent application 201210483255.9 filed on Nov. 23, 2012, the disclosures of which are hereby incorporated by reference.

TECHNICAL FIELD

The present document relates to a method and a terminal for acquiring road condition information.

BACKGROUND OF THE RELATED ART

In the related art, in order to acquire the road condition information, the terminal with the positioning system usually reports its own positioning information to a particular central server through the network of operator, and the particular central server processes the collected information reported by a large number of terminals and then sends the road condition information in the area selected by the terminal to the terminal.

There is the following insufficient in the method for acquiring the road condition information:

firstly, it needs to set up the central server for processing, and the data bulk is big, the system is complicated and the maintenance is difficult;

secondly, it needs to cover the cost for using the network of mobile operator, and it cannot work normally when the network signal of the mobile operator is not good or the network fails; because the system needs to interact with the base station of the mobile operator, the viability and the capability to resist damage are poor; it is difficult for the navigation systems interacting with different operators to perform the interaction with each other;

thirdly, influenced by the processing capacity of the central server and the network congestion situation, it is apt to have a larger delay and it cannot perform the accurate real-time navigation for road condition, and it cannot prevent and avoid the emergence of the traffic accident.

SUMMARY OF THE INVENTION

The present document provides a method and a terminal for acquiring road condition information, to solve the technical problem how to realize acquiring the road condition information without an operator.

In order to solve the above-mentioned technical problem, the embodiment of the present document provides a method for acquiring road condition information by a terminal, comprising:

forming an Ad Hoc network with other terminals;

acquiring own position information through positioning;

exchanging position information with other terminals in a network through the Ad Hoc network;

acquiring the road condition information according to the exchanged position information.

Alternatively, the step of exchanging position information with other terminals in a network through the Ad Hoc network comprises:

exchanging the position information with the other terminals in the network through the Ad Hoc network every other preset time;

or, exchanging the position information with the other terminals in the network through the Ad Hoc network when the own position information changes.

Alternatively, the step of acquiring the road condition information according to the exchanged position information comprises:

setting a relative distance D1, and raising an alarm when detecting that a relative distance between a position of the other terminal and an own position is less than D1 according to the exchanged position information.

Alternatively, the method further comprises:

exchanging a terminal ID with the other terminals in the network through the Ad Hoc network.

Alternatively, the step of acquiring the road condition information according to the exchanged position information comprises:

setting a relative distance D2 to a designated terminal ID, and raising an alarm when detecting that the relative distance between a position of the designated terminal ID and the own position is greater than D2 according to the exchanged position information.

In order to solve the above-mentioned technical problem, the embodiment of the present document provides a terminal for acquiring road condition information, comprising an Ad Hoc network connection module, a positioning module, an information interaction module and a road condition information acquiring module, wherein:

the Ad Hoc network connection module is configured to form an Ad Hoc network with other terminals;

the positioning module is configured to acquire own position information through positioning;

the information interaction module is configured to exchange position information with other terminals in a network through the Ad Hoc network; and the road condition information acquiring module is configured to acquire the road condition information according to the exchanged position information.

Alternatively, the information interaction module is:

configured to exchange the position information with the other terminals in the network through the Ad Hoc network every other preset time; or, exchange the position information with the other terminals in the network through the Ad Hoc network when the own position information changes.

Alternatively, the road condition information acquiring module is configured to set a relative distance D1, and raise an alarm when detecting that a relative distance between a position of the other terminal and an own position is less than D1 according to the exchanged position information.

Alternatively, the information interaction module is further configured to exchange a terminal ID with the other terminals in the network through the Ad Hoc network.

Alternatively, the road condition information acquiring module is further configured to set a relative distance D2 to a designated terminal ID, and raise an alarm when detecting that a relative distance between a position of the designated terminal ID and the own position is greater than D2 according to the exchanged position information.

In the above-mentioned technical scheme, the terminals exchanges the position information with each other by using the Ad Hoc technology, which can realize a technical effect of acquiring the road condition information without an operator.

PREFERRED EMBODIMENTS OF THE PRESENT DOCUMENT

Figure 1:
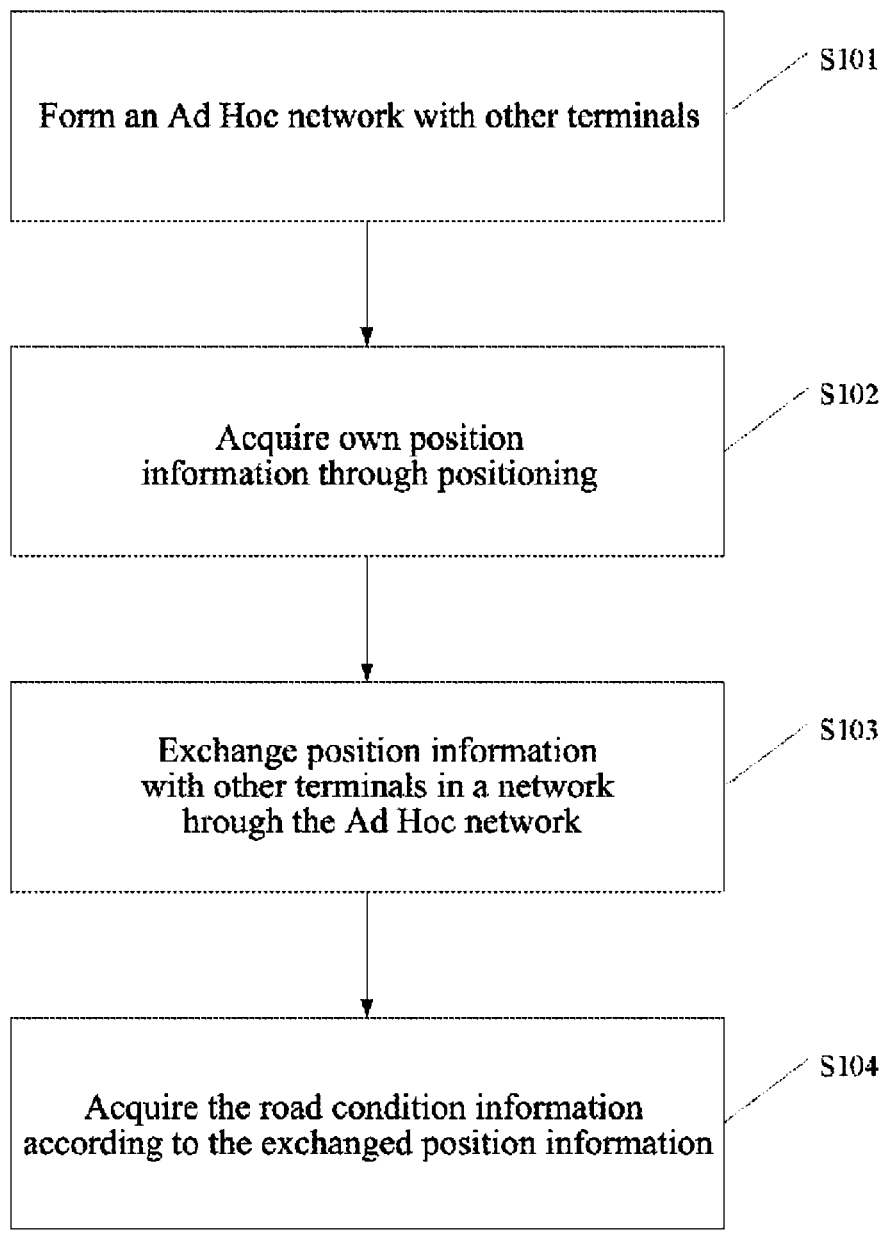
FIG. 1 is a flow chart of a method for acquiring road condition information of the present embodiment.

The embodiment of the present document is described in detail with reference to the accompanying drawings hereinafter. It should be illustrated that, in the case of not conflicting, the embodiments in the present application and features in these embodiments can be combined with each other at random. FIG. 1 is a flow chart of a method for acquiring road condition information by a terminal of the present embodiment.

FIG. 1 is a flow chart of a method for acquiring road condition information by a terminal of the present embodiment.

In S101, the terminal forms an Ad Hoc network with other terminals.

Because the terminal possessing the Ad Hoc function in the practical environment is not unique, in order to prevent the terminal from establishing a connection with uncorrelated terminal when setting up the Ad Hoc network, the present embodiment can also set a fixed password for the terminal used for acquiring the road condition information, and the identity authentication is performed firstly when the terminal forms the Ad Hoc network with the other terminals, and the connection is established after the authentication is passed.

In S102, the terminal acquires own position information through positioning.

The common positioning system includes: the global positioning system (GPS), the BeiDou satellite positioning system, the Glonass satellite positioning system and the Galileo satellite positioning system.

The position information includes: longitude and latitude, speed and direction.

In S103, the terminal exchanges position information with other terminals in a network through the Ad Hoc network.

Step S103 can be realized through the following way:

the terminal exchanges the position information with other terminals in the network through the Ad Hoc network every other preset time; it ensures to acquire the position information of the terminal in time through the preset time, of which the real time is strong and the error is small;

or, the position information is exchanged with other terminals in the network through the Ad Hoc network when the own position information changes; the frequency of the interaction of the terminal in the Ad Hoc network is controlled through setting the interaction condition, which reduces the amount of unnecessary interaction information.

In S104, the terminal acquires the road condition information according to the exchanged position information.

The terminal can prevent the dangerous accident, such as, the vehicle collision, etc., according to the interaction information, for example, setting a relative distance D1 for the terminal, and raising an alarm when the terminal detects that a relative distance between the position of the other terminal and the own position is less than D1.

The terminal can also check the congestion situation of the road section according to the interaction information, for example, the terminal can know the situation of distribution of other terminals from the received position information of other terminals from the Ad Hoc network; if other terminals are distributed intensively in a certain road section, then the road section is relatively congested; on the contrary, then the road section is relatively smooth.

Figures 2, 3:
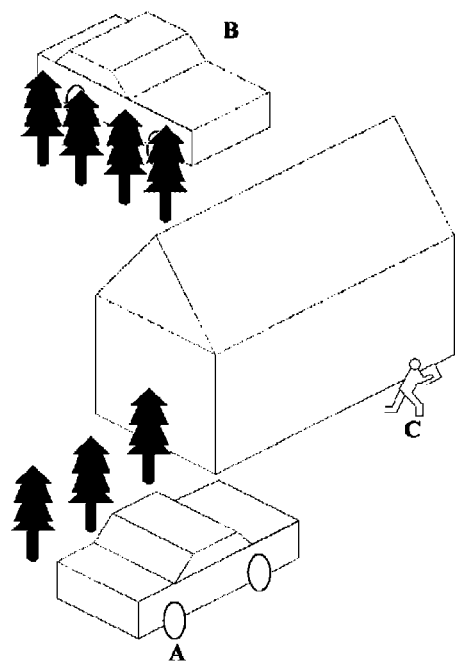
FIG. 2 is a structure diagram of a terminal sending data of the present embodiment.
FIG. 3 is a diagram of an application scene of the present embodiment.

In other embodiments, the terminal in the Ad Hoc network can also exchanges its own terminal ID besides exchanging the position information, and even exchanges the carrier type of the terminal, such as a car, a motorcycle, a electric vehicle, a building, people and even articles. FIG. 2 provides a structure diagram of a terminal sending data. When the exchanged content between the terminals includes the terminal ID, the terminal can set a relative distance D2 to a designated terminal ID and raise an alarm when detecting that the relative distance between the position of the designated terminal ID and the own position is greater than D2; and the technical means can be used in the fleet management, to prevent motorcade members from getting separated.

FIG. 3 is a diagram of an application scene of the present embodiment.

In the scene, the barrier in the road corner blocks the sight of the drivers of the motor vehicles A and B and the pedestrian C, and such a road section belongs to a road section with high incidence of accidents.

After the motor vehicles A and B and the pedestrian C all carry the terminal recorded in the above-mentioned embodiment, through setting up the Ad Hoc network among terminals, the terminals can acquire the current position information of A, B and C; in this way, the drivers of A and B and the pedestrians C can perform the safety avoidance according to the position information, which reduces the accident rate of the road section greatly.

Figure 4:
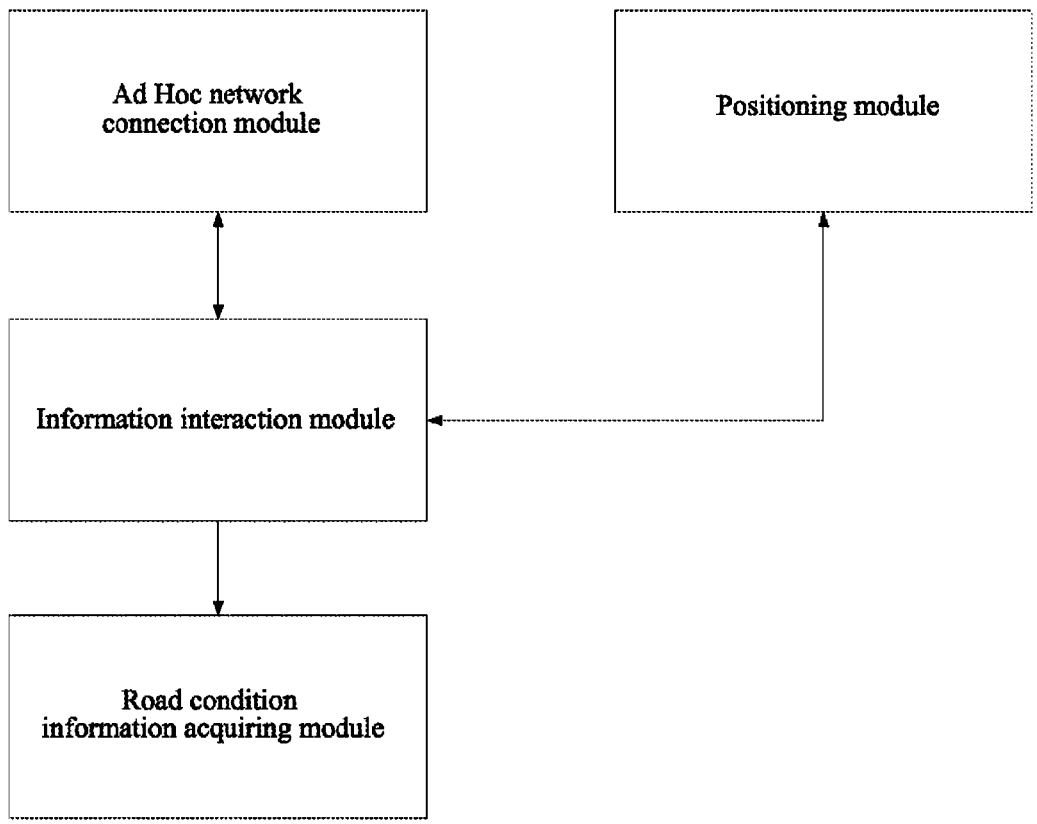
FIG. 4 is module diagram of a terminal for acquiring road condition information of the present embodiment.

FIG. 4 is module diagram of a terminal for acquiring road condition information of the present embodiment.

The terminal includes an Ad Hoc network connection module, a positioning module, an information interaction module and a road condition information acquiring module, wherein:

the Ad Hoc network connection module is configured to form an Ad Hoc network with other terminals;

the positioning module is configured to acquire own position information through positioning;

the positioning module can be: the global positioning system (GPS) module, the BeiDou satellite positioning system module, the Glonass satellite positioning system module or the Galileo satellite positioning system module;

the information interaction module is configured to exchange position information with other terminals in a network through the Ad Hoc network;

the position information includes: longitude and latitude, speed and direction;

the information interaction module is configured to exchange the position information with the other terminals in the network through the Ad Hoc network every other preset time; or, exchange the position information with the other terminals in the network through the Ad Hoc network when the own position information changes;

the road condition information acquiring module is configured to acquire the road condition information according to the exchanged position information.

The road condition information acquiring module can be configured to set a relative distance D1, and raise an alarm when detecting that a relative distance between the position of the other terminals and the own position is less than D1, in order to prevent dangerous accidents, such as the vehicle collision and so on.

In other embodiments, the above-mentioned information interaction module further can be configured to exchange the terminal ID with the other terminals in the network through the Ad Hoc network, and even exchange the carrier type of the terminal, such as a car, a motorcycle, a electric vehicle, a building, people and even articles. Now, the can road condition information acquiring module can be configured to set a relative distance D2 to a designated terminal ID, and raise an alarm when detecting that the relative distance between the position of the designated terminal ID and the own position is greater than D2; and the technical means can be used in the fleet management, to prevent motorcade members from getting separated.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate but not to limit the technical scheme of the present application, and the present application is described in details only according to the preferable embodiments. Those skilled in the art should understand that they can make the modifications and equivalent replacements according to the technical scheme of the present application without departing from the spirit and scope of technical scheme of the present application, which should be included in the scope of the appended claims of the present application.

INDUSTRIAL APPLICABILITY

In the above-mentioned technical scheme, the terminals exchange the position information with each other by using the Ad Hoc technology, which can realize a technical effect of acquiring the road condition information without an operator.

What we claim is:

1. A method for acquiring road condition information, comprising:
   forming an Ad Hoc network with other terminals by a terminal with a positioning system;
   acquiring own position information through the positioning system;
   communicating with other terminals in a network through the Ad Hoc network to exchange position information;
   acquiring the road condition information according to the exchanged position information, comprising:
      exchanging a terminal ID with the other terminals in the network through the Ad Hoc network;
      setting a relative distance D2 to a designated terminal ID, and
      raising an alarm when detecting that a relative distance between a position of the designated terminal ID and the own position is greater than D2 according to the exchanged position information to prevent queue members from getting separated.

2. The method according to claim 1, wherein, the step of exchanging position information with other terminals in a network through the Ad Hoc network comprises:
   exchanging the position information with the other terminals in the network through the Ad Hoc network every other preset time;
   or, exchanging the position information with the other terminals in the network through the Ad Hoc network when the own position information changes.

3. The method according to claim 2, wherein, the step of acquiring the road condition information according to the exchanged position information comprises:
   setting a relative distance D1, and raising an alarm when detecting that a relative distance between a position of the other terminal and an own position is less than D1 according to the exchanged position information.

4. The method according to claim 1, wherein, the step of acquiring the road condition information according to the exchanged position information comprises:
   setting a relative distance D1, and raising an alarm when detecting that a relative distance between a position of the other terminal and an own position is less than D1 according to the exchanged position information.

5. A terminal for acquiring road condition information, comprising a positioning system configured to acquiring own position information, and a processor configured to:
   form an Ad Hoc network with other terminals;
   communicate with other terminals in a network through the Ad Hoc network to exchange position information; and
   acquire the road condition information according to exchanged position information, comprising:
      exchanging a terminal ID with the other terminals in the network through the Ad Hoc network;
      setting a relative distance D2 to a designated terminal ID, and
      raising an alarm when detecting that a relative distance between a position of the designated terminal ID and the own position is greater than D2 according to the exchanged position information to prevent queue members from getting separated.

6. The terminal according to claim 5, wherein:
   the processor is configured to exchange the position information with the other terminals in the network through the Ad Hoc network every other preset time; or, exchange the position information with the other terminals in the network through the Ad Hoc network when the own position information changes.

7. The terminal according to claim 6, wherein:
   the road condition information acquiring module is configured to set a relative distance D1, and raise an alarm when detecting that a relative distance between a position of the other terminal and an own position is less than D1 according to the exchanged position information.

8. The terminal according to claim 5, wherein:
   the road condition information acquiring module is configured to set a relative distance D1, and raise an alarm when detecting that a relative distance between a position of the other terminal and an own position is less than D1 according to the exchanged position information.

* * * * *